United States Patent
Qin et al.

(10) Patent No.: US 6,910,151 B2
(45) Date of Patent: Jun. 21, 2005

(54) BACKUP/RECOVERY SYSTEM AND METHODS REGARDING THE SAME

(75) Inventors: Simon Qin, Chongqing (CN); Leezy Bao, Chongqing (CN)

(73) Assignee: Farstone Technology Inc., Taipei (TW)

( * ) Notice: Subject to any disclaimer, the term of this patent is extended or adjusted under 35 U.S.C. 154(b) by 451 days.

(21) Appl. No.: 09/885,499

(22) Filed: Jun. 19, 2001

(65) Prior Publication Data

US 2002/0184559 A1 Dec. 5, 2002

(30) Foreign Application Priority Data

Jun. 1, 2001 (TW) ........................................ 90113341 A

(51) Int. Cl.⁷ .............................................. G06F 11/00
(52) U.S. Cl. ....................................................... 714/6
(58) Field of Search ............................... 714/6, 15, 20; 707/204

(56) References Cited

U.S. PATENT DOCUMENTS

| | | | | |
|---|---|---|---|---|
| 5,263,154 A | * | 11/1993 | Eastridge et al. | 714/6 |
| 5,363,098 A | * | 11/1994 | Antoshenkov | 341/95 |
| 5,522,037 A | * | 5/1996 | Kitagawa et al. | 714/40 |
| 5,720,026 A | * | 2/1998 | Uemura et al. | 714/6 |
| 5,850,565 A | * | 12/1998 | Wightman | 710/1 |
| 6,018,747 A | * | 1/2000 | Burns et al. | 707/203 |
| 6,088,694 A | * | 7/2000 | Burns et al. | 707/8 |
| 6,189,016 B1 | * | 2/2001 | Cabrera et al. | 707/203 |
| 6,629,110 B2 | * | 9/2003 | Cane et al. | 707/204 |
| 2002/0010702 A1 | * | 1/2002 | Ajtai et al. | 707/101 |
| 2002/0161860 A1 | * | 10/2002 | Godiin et al. | 709/219 |
| 2002/0184559 A1 | * | 12/2002 | Qin et al. | 714/13 |
| 2003/0177149 A1 | * | 9/2003 | Coombs | 707/204 |

* cited by examiner

*Primary Examiner*—Bryce P. Bonzo
(74) *Attorney, Agent, or Firm*—Hogan & Hartson, LLP

(57) ABSTRACT

A backup/recovery system and methodology that securely backs up every type of data in a computer system. According to the invention, backup/recovery system is utilized for protecting a computer system, having a first type data and a second type data. The first type data and the second type data can be changed respectively. In one embodiment of the invention, backup/recovery system is installed in the computer system. The backup/recovery system includes at least a selecting module and a processing module. A selecting module is used for selecting a first predetermined mode in accordance with the first type data and selecting a second predetermined mode in accordance with the second type data. A processing module is coupled to the selecting module, for processing the first type data and the second type data. The processing module backs up valid data being changed within the first type data while the first predetermined mode is selected by the selecting module. The processing module backs up all valid data within the second type data while the second predetermined mode is selected by the selecting module. The first type data is stored into a first variable data storage space in the computer system, and the second type data is stored into a second variable data storage space in the computer system, the first variable data storage space and the second variable data storage space are adjustable in size and proportion, so as to make good use of data storage means, such as a hard disk, and enhance the efficiency, which can also improve protective capability.

8 Claims, 2 Drawing Sheets

BACKUP/RECOVERY SYSTEM AND METHODS REGARDING THE SAME

BACKGROUND OF THE INVENTION

1. Field of the Invention

The present invention relates generally to a backup/recovery technique for a computer system, and more particularly to a backup/recovery system and method that securely backs up every type of data in a computer system according to the characteristic of such data.

2. Description of Prior Art

Conventional backup/recovery software establishes recovery points to backup data by using a static backup technique for storing data over a long period of time. When the data is in a state of maintenance, all valid data of such data in maintenance will be backed up. Accordingly to the conventional backup/recovery software, backing up data by this static backup technique takes up fixed storage space in the computer system. Moreover, the backed-up data is kept in a state of perpetuity, independent of other current or future data contained in a data storage means, such as a hard disk, of the computer system.

When executing the backup operation, the conventional backup/recovery software backs up all valid data in the data storage means by using the static backup technique and then keeps the backed-up data in a recovery point within a storage space. Ordinarily, the backed-up data occupies a large amount of storage space in the data storage means due to the great amount of valid data backed up. Moreover, the processing speed of the conventional backup/recovery software in backing up and/or recovering data is quite slow.

For example, the conventional backup/recovery software, such as the Ghost software developed by Symantec Corporation, includes a backup program to back up all data stored in selected partitions of the hard disk to a file. In addition, it further includes a recovery program for restoring the data from the file to the selected partitions of the hard disk. Prior to backing up the data, the Ghost software stops all other tasks in the computer. It then creates the backup file, with all the backed-up data, in a single task procedure. Generally, this backup procedure takes about 8 minutes per Gigabyte.

Since the Ghost software backs up all the valid data stored in the hard disk, the data itself backed up by the Ghost software occupies an extremely large space in the hard disk. In addition, all data currently used by the file system of the operating system (OS) will be backed up into the backup file. This occurs no matter whether such related data would be further changed in the future or not, thereby further occupying a great amount of space in the hard disk.

In a situation of independent operation from the current data of the hard disk, the conventional backup/recovery software can execute the restoration of previously backed up data in the hard disk. The conventional backup/recovery software nevertheless must back up the prior data in the hard disk. It is imperative that the prior data must be backed up fully beforehand. The conventional backup/recovery software with static backup technique, however, stores all the backed-up data in a region of the hard disk that other programs can have access also. This would likely induce the newly backed-up data to be destroyed. As a result, it would be almost impossible to restore the hard disk with such backed-up data for that has already been destroyed.

Current techniques available in the conventional backup/recovery software provide no notion of how to solve the problem of destroyed backed up data, not to mention the result of incapable reconstruction. In order to avoid destruction to the backed up data from taking place, users of the computer system will have to undertake some protective steps to carefully protect their backup data. Nevertheless, this would require very complex, yet probably questionable, procedures taken by the users. For instance, the users may store the backup data in a storage medium, such as backing up data to a CD-R disc. This, however, makes it very inconvenient to the users.

To save the storage space in the hard disk, some presently available backup/recovery software, such as the Goback software developed by Adaptec Corporation and the Pro Magic software developed by WASAY Incorporation, adopt a dynamic backup technique in establishing recovery points during the data backup process. Such dynamic backup technique restores the computer system to a previous state, in accordance with the previous backup data, from a current state. The valid data is backed up prior to making changes to the data. The backup file contains the backup data and identification information to identify the backup data. Such identification information is useful restoring the computer system in the future.

If there are not much change of the data, the data amount to be backed up will be relatively small. Accordingly, the storage space that will be occupied by the backup data can be reduced, and the required process time for restoration will also be short.

However, the dynamic backup technique has one major drawback. That is the restoration process of the dynamic backup technique depends on the current state of the data in the hard disk. For this reason, every change to the data has to be backed up by the conventional backup/recovery software.

But changes to the data in the hard disk usually grow in quantity as the time goes by. As such, the required recovery points and the valid data to be backed up will also increase. The increment of the size of the backup data gradually brings about a shortage of the storage space for storing data in the hard disk. Therefore, the computer system cannot keep all previously stored recovery points timelessly for the users. Some recovery points established previously will have to be deleted accordingly. It would be difficult for the users to attempt to keep a long-term certain state about the backup data.

In other words, the conventional backup/recovery software even though has the backup/recovery capabilities to back up and/or recover data in the hard disk, the amount of the data storage space required by the static backup technique is ordinarily larger than that is required by the dynamic backup technique. There are concerns about the data storage space consuming and time-consuming for the conventional backup/recovery software using static backup technique.

The dynamic backup technique used in the conventional backup/recovery software, on the other hand, often causes the problem of incapable of keeping earlier backup states permanently. Moreover, such conventional software intermingles previously stored recovery points needed to be preserved over a long period of time with the current data or any new recovery points just needed temporarily. Presently available backup/recovery software products either have the problems of being unable to keep the earlier stored recovery points permanently or have the problems of keeping the data states corresponding to the recovery points permanently, which indeed are needed only for a short period of time, thereby inducing the waste of data storage space and long consuming time during the backup and restoration.

SUMMARY OF THE INVENTION

The present invention provides a backup/recovery system and method to resolve the foregoing problems faced by the conventional backup/recovery software. The present invention also has the advantage of providing a long protective period and a high recovery precision to the backup data.

An object of the present invention is to provide a backup/recovery system and method, wherein dynamic recovery points and static recovery points thereof can share data backup space in a storage means proportionally. The storage proportion of the dynamic backup space with respect to the static backup space is automatically adjustable based on the needs of the users or the condition of the data to be backed up.

Another object of the present invention is to provide a backup/recovery system and method, which can prolong the time period in protecting computer data of identical backup space conditions. Moreover, the amount of states of protected computer data is increased within identical duration.

A further object of the present invention is to provide a backup/recovery system and method, which can eliminate the operation dependence on the OS (operating system), to achieve the highest independent character and reliability. Moreover, according to the present invention, the backup space is concealed from the users, so as to prevent purposeful or involuntary violence to the backup data, in order to substantially raise the reliability.

In accordance with an aspect of the present invention, a backup system is installed in a computer system. The computer system has a first type data and a second type data, the first type data and the second type data can be changed respectively. The backup/recovery system includes at least a selecting module and a processing module. A selecting module is used for selecting a first predetermined mode in accordance with the first type data and selecting a second predetermined mode in accordance with the second type data. A processing module is coupled to the selecting module, for processing the first type data and the second type data. The processing module backs up valid data being changed within the first type data while the first predetermined mode is selected by the selecting module. The processing module backs up all valid data within the second type data while the second predetermined mode is selected by the selecting module.

In the preferred embodiment of the invention, the first type data is a temporary data needless to be preserved permanently, and the second type data is a perpetual data needed to be preserved over a long period of time. The selecting module selects the first predetermined mode or the second predetermined mode through an interface. In accordance with the first predetermined mode, the valid data in the first type data would be changed. The first type data can be used for restoring the computer system back to a state immediately before backing up the first type data. In accordance with the second predetermined mode, the second type data is in a state of maintenance. The processing module executes a backup program. The first type data is stored into a first space included in the computer system. The size of the first space is variable. The second type data is stored into a second space included in the computer system. The size of the second space is variable. The first type data is stored into a first variable space in the computer system, and the second type data is stored into a second variable space in the computer system, the first variable space and the second variable space are adjustable in size and proportion.

In accordance with another aspect of the present invention, a backup method is suitable for a computer system. The computer system has a predetermined temporary data and a predetermined perpetual data, the predetermined temporary data and the predetermined perpetual data can be changed respectively. The backup method comprising the steps of: selecting a first process mode in accordance with the predetermined temporary data; and backing up valid data being changed within the predetermined temporary data in accordance with the first process mode.

In the preferred embodiment of the invention, the backup method further comprises the step of storing the predetermined temporary data in a first backup space of the computer system, wherein the first backup space is variable and adjustable. The first process mode is selected by a selecting module. The predetermined temporary data can be used for restoring the computer system. A second predetermined mode is selected in accordance with the predetermined perpetual data; all valid data within the predetermined perpetual data would be backed up in the second process mode. The predetermined perpetual data is stored in second backup space of the computer system; the second backup space is variable and adjustable. The predetermined temporary data is stored in a first backup space of the computer system, the predetermined perpetual data is stored in second backup space of the computer system, the first and the second backup space are variable and adjustable, the first and the second backup space constitute a total backup space. The total backup space is variable and adjustable in size and proportion of the first and the second backup space.

In accordance with a further aspect of the present invention, another backup method is suitable for a computer system. The computer system has a predetermined temporary data and a predetermined perpetual data, the predetermined temporary data and the predetermined perpetual data can be changed respectively. Another backup method comprising the steps of: selecting a first process mode in accordance with the predetermined perpetual data; and backing up all valid data within the predetermined perpetual data in accordance with the first process mode.

In the preferred embodiment of the invention, the backup method further comprises the step of storing the predetermined perpetual data in a first backup space of the computer system, wherein the first backup space is variable and adjustable. The first process mode is selected by a selecting module. The predetermined perpetual data is in a state of maintenance. A second predetermined mode is selected in accordance with the predetermined temporary data; valid data being changed within the predetermined temporary data would be backed up in the second process mode. The predetermined temporary data is stored in the second backup space of the computer system; the second backup space is variable and adjustable. The predetermined perpetual data is stored in a first backup space of the computer system, the predetermined temporary data is stored in a second backup space of the computer system, the first backup space and the second backup space are variable and adjustable, the first backup space and the second backup space together constitute a total backup space. The total backup space is variable and adjustable in size and proportion of the first backup space and the second backup space.

The present invention may best be understood through the following description with reference to the accompanying drawings, in which:

DETAILED DESCRIPTION OF THE PREFERRED EMBODIMENT

Figure 1:
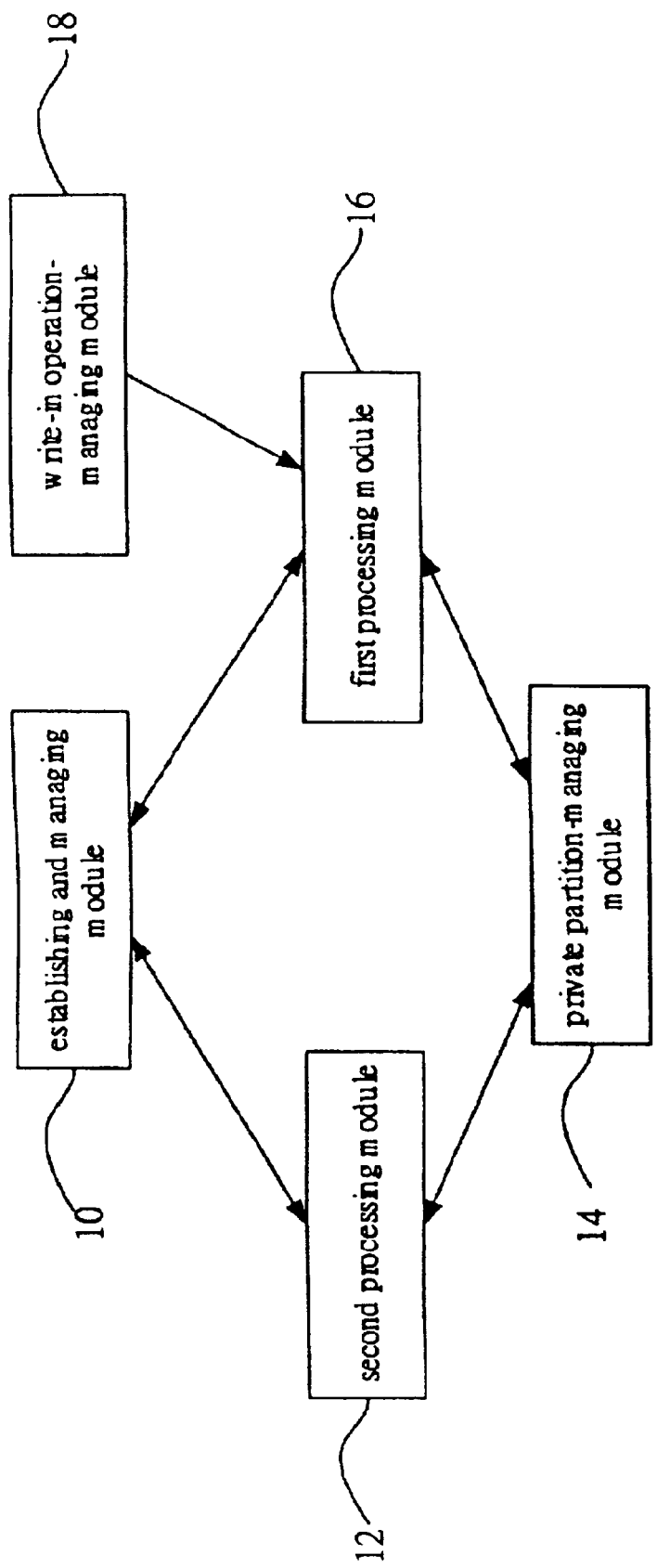
FIG. 1 shows a schematic block diagram of a backup/recovery system of a preferred embodiment according to the present invention.

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

The present invention describes a new backup technique for a backup/recovery system to establish both dynamic recovery points and static recovery points, which can share backup space proportionally. The storage proportion of the dynamic backup space with respect to the static backup space is automatically adjustable based on the needs of the users or the condition of the data to be backed up. Moreover, the users will have no confusion and difficulty in operating the presently described backup/recovery system. Accordingly, the problem of wasting data storage space can be solved, the protective capability and the efficiency of the described backup/recovery system can be increased. The presently described backup/recovery system, thus, serves users' demands much more adequately.

With the backup technique of the present invention, the users can securely back up every type of data in accordance with the characteristics of data. The users can also keep the states of previously stored backup data timelessly, independent from the current data state.

The users can also back up and/or recover data promptly in order to economize on storage space occupied by the backup data. Therefore, the drawbacks faced by the prior arts can be solved completely.

According to the preferred embodiment of the present invention, a backup system is installed in a computer system. The computer system has a first type data and a second type data, the first type data and the second type data can be changed respectively. The backup/recovery system includes at least a selecting module and a processing module. A selecting module is used for selecting a first predetermined mode in accordance with the first type data and selecting a second predetermined mode in accordance with the second type data. A processing module is coupled to the selecting module, for processing the first type data and the second type data. The processing module backs up valid data being changed within the first type data while the first predetermined mode is selected by the selecting module. The processing module backs up all valid data within the second type data while the second predetermined mode is selected by the selecting module.

The first type data is a temporary data needless to be preserved permanently, and the second type data is a perpetual data needed to be preserved over a long period of time. The selecting module selects the first predetermined mode or the second predetermined mode through an interface. In the first predetermined mode, the valid data in the first type data would be changed. The first type data can be used for restoring the computer system back to a state immediately before backing up the first type data. In the second predetermined mode, the second type data is in a state of maintenance. The processing module executes a backup program. The first type data is stored into a first space included in the computer system. The size of the first space is variable. The second type data is stored into a second space included in the computer system. The size of the second space is variable. The first type data is stored into a first variable space in the computer system, and the second type data is stored into a second variable space in the computer system, the first variable space and the second variable space are adjustable to regulate the size and the proportion.

Referring to FIG. 1, a schematic block diagram of a backup/recovery system of a preferred embodiment according to the present invention is shown. The backup/recovery system of the present invention is suitable for a computer system, which stores a first type data and a second type data. The first type data and the second type data can be changed respectively. The backup/recovery system includes at least a selecting module and a processing module.

The selecting module comprises an establishing and managing module 10. The establishing and managing module 10 is used to establish recovery points for different demands, and to facilitate managing the recovery points. The establishing and managing module 10 has a selecting interface, which can be a computer/human interface. Through the computer/human interface, the users can use the backup/recovery system more easily, so that the users' satisfactions can be adequately met.

The processing module is coupled to the selecting module. The processing module is capable of executing a backup/recovery program to process the first type data and the second type data of the computer system. The first type data is a temporary data needless to be preserved permanently, and the second type data is a perpetual data needed to be preserved over a long period of time.

The processing module includes a first processing module 16, a private partition-managing module 14, a second processing module 12 and a write-in operation-managing module 18.

The establishing and managing module 10 is used to receive the recovery point-establishing request issued from the users and the establishing request issued from the auto-establishing module. The selecting function accepts users' choices with respect to the establishing mode according to their needs. The establishing mode for the recovery point has at least two selections. One is a first predetermined mode, and the other is a second predetermined mode. The users can choose the first predetermined mode in accordance with the first type data, or choose the second predetermined mode in accordance with the second type data.

The write-in operation-managing module 18 is used to take over all write-in operations to the data storage means, such as the hard disk, from outside. The write-in operation-managing module 18 receives all of the requests of changing disk data. The requests of changing data may include the designated address of the hard disk or the new data. The write-in operation-managing module 18 analyzes and identifies those data to be backed up and issues the backup request to the first processing module 16 to back data up.

The first processing module 16 is responsible for the first predetermined mode, which keeps track of backing up valid data being changed within the first type data and stores into a first backup space included in the computer system. The size of the first backup space is variable and can be adjusted automatically. The stored backup data contains therein the information regarding all changed sectors. For instance, the stored backup data includes the data that should be backed up having the data of fixed bytes contained in a changed sector itself and the sector number corresponding to this changed sector.

The second processing module 12 is responsible for the second predetermined mode, which backs up all valid data of the second type data, i.e., all valid data of the disk area needed to be protected. The second type data is in a state of permanent maintenance and is stored into a second backup space included in the computer system. The size of the second backup space is changeable and can be adjusted automatically.

The first backup space and the second backup space together form a total backup space. The total backup space is variable and capable of automatically regulating the size and the proportion of the first backup space with respect to the second backup space.

The private partition-managing module 14 is used to delimit parts of the areas of the disk as the special purpose partition. The special purpose partition can write in data for the recovery points of the first processing module 16 and the second processing module 12, which can be used by the backup/recovery system only.

According to the preferred embodiment of the present invention, a backup method is suitable for a computer system. The computer system has a predetermined temporary data and a predetermined perpetual data, the predetermined temporary data and the predetermined perpetual data can be changed respectively. The backup method comprising the steps of: selecting a first process mode in accordance with the predetermined temporary data; and backing up valid data being changed within the predetermined temporary data in accordance with the first process mode.

The backup method further comprises the step of storing the predetermined temporary data in a first backup space of the computer system, wherein the first backup space is variable and adjustable. The first process mode is selected by a selecting module. The predetermined temporary data can be used for restoring the computer system. A second predetermined mode is selected in accordance with the predetermined perpetual data. All valid data within the predetermined perpetual data would be backed up during the second process mode. The predetermined perpetual data is stored in the second backup space of the computer system, and the second backup space is variable and adjustable. The predetermined temporary data is stored in a first backup space of the computer system, the predetermined perpetual data is stored in a second backup space of the computer system, the first and the second backup space are variable and adjustable, and the first and the second backup space together constitute a total backup space. The total backup space is variable and adjustable in size and proportion of the first and the second backup space.

According to the preferred embodiment of the present invention, there is another backup method suitable for a computer system. The computer system has a predetermined temporary data and a predetermined perpetual data. The predetermined temporary data and the predetermined perpetual data can be changed respectively. Another backup method comprising the steps of: selecting a first process mode in accordance with the predetermined perpetual data; and backing up all valid data within the predetermined perpetual data in accordance with the predetermined mode.

Another backup method further comprises the step of storing the predetermined perpetual data in a first backup space of the computer system, wherein the first backup space is variable and adjustable. The predetermined mode is selected by a selecting module. The predetermined perpetual data is in a state of maintenance. A second predetermined mode is selected in accordance with the predetermined temporary data, wherein valid data being changed within the predetermined temporary data would be backed up in the second predetermined mode. The predetermined temporary data is stored in the second backup space of the computer system, and the second backup space is variable and adjustable. The predetermined perpetual data is stored in a first backup space of the computer system, the predetermined temporary data is stored in a second backup space of the computer system, the first and the second backup space are variable and adjustable, and the first backup space and the second backup space together constitute a total backup space. The total backup space is variable and adjustable in size and proportion of the first and the second backup space.

Figure 2:
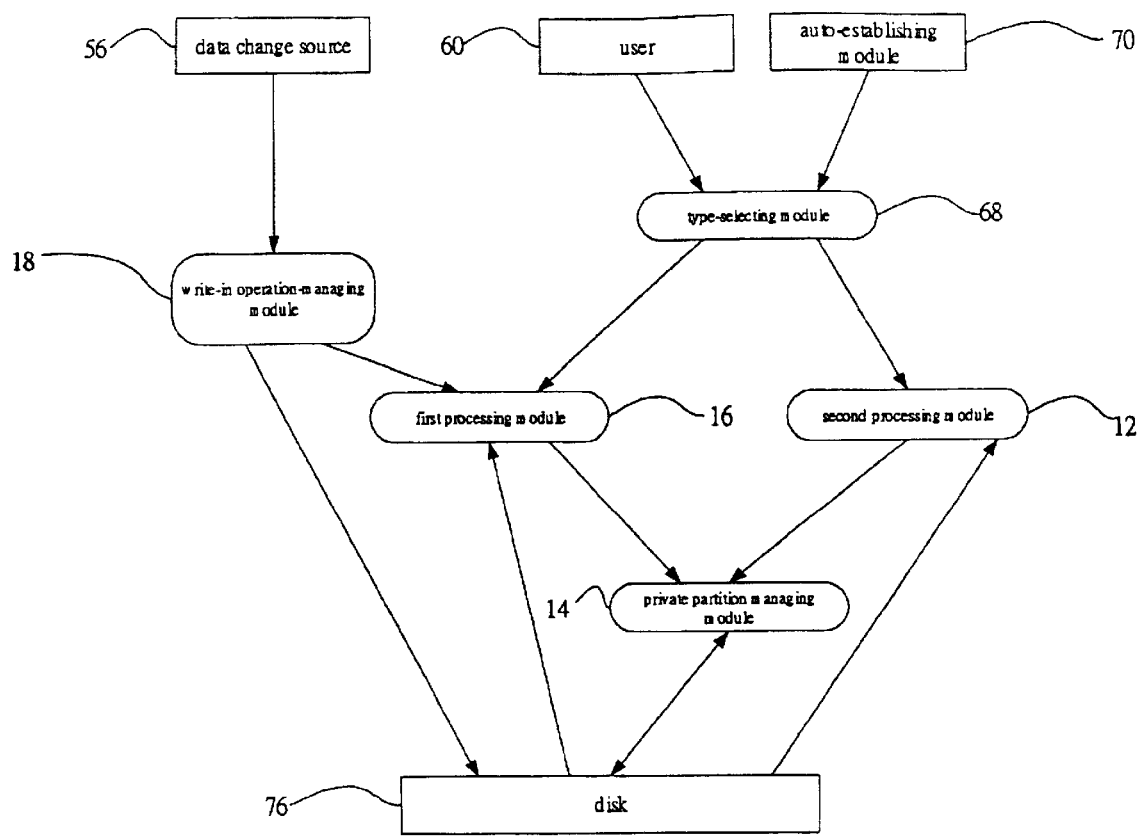
FIG. 2 shows a schematic flow chart of a backup/recovery method of the preferred embodiment according to the present invention.

Referring to FIG. 2, a schematic flow chart of a backup/recovery method of the preferred embodiment according to the present invention is shown. According to the present invention, the backup/recovery method of the present invention is suitable for a computer system, which has a predetermined temporary data and a predetermined perpetual data. The predetermined temporary data and the predetermined perpetual data can be changed respectively. The backup method includes at least a selecting step and a processing step.

The selecting step can be done in the establishing and managing module 10 (as shown in FIG. 1) of the selecting module. Generally speaking, a computer system connected to a network will often be easily infected by virus. Hence, the backup/recovery system of the present invention provides an auto-establishing module 70, in order to automatically establish a recovery point prior to receiving data from the network. When there is any unexpected accident happens, the backup/recovery system can restore the computer system to a previous state.

As shown in FIG. 2, the type-selecting module 68 is designed to receive the recovery point-establishing request issued from the users 60 and the establishing request issued from the auto-establishing module 70. Upon the type-selecting module 68 receives the request for establishing recovery point that is issued from the users 60 or the auto-establishing module 70, the selecting function of the type-selecting module 68 chooses a selecting mode for the recovery point according to the requests.

The backup/recovery method of the present invention provides the capability of options that may be chose by an user, so that every type of data in a computer system can be backed up and/or restored according to an user's choice. The user can choose, through the computer/human interface of the type-selecting module 68, the first predetermined mode processed by the first processing module 16 in accordance with the predetermined temporary data or can choose the second predetermined mode processed by the second processing module 12 in accordance with the predetermined perpetual data. The user can also choose the establishing mode for the recovery points taking either the occupied storage space or the speed of data backup/recovery into consideration to satisfy the user's needs.

The second processing module 12 backs data up on the understanding that the type-selecting module 68 selects the second predetermined mode processed by the second processing module 12. All the valid data of the second predetermined mode, which is in a state of permanent maintenance, will be backed up and stored into a perpetual backup space included in the computer system. The size of the perpetual backup space is changeable and can be adjusted automatically.

As shown in this figure, all the valid data in the disk 76, that is, all of the valid data of the disk area that needs to be protected, is processed in the second processing module 12. The second processing module 12 writes the recovery point data in the private partition-managing module 14. The private partition-managing module used by the backup/recovery system has never been developed by any other software developers. The private partition-managing module 14 delimits parts of the areas of the disk 76 as the special purpose partition. The private partition-managing module 14 can write in data for the recovery points of the second processing module 12.

The first processing module 16 backs data up on the understanding that the type-selecting module 68 selects the first predetermined mode processed by the first processing module 16. The first processing module 16 keeps track of backing up valid data being changed within the first type data and stores into a temporary backup space included in the computer system. The size of the temporary backup space is variable and can be automatically adjusted. The temporary backup space and the perpetual backup space form a total backup space. The total backup space is variable and capable of automatically regulating the size and the proportion of the temporary backup space with respect to the perpetual backup space.

As shown in this figure, the valid data being changed in the disk 76, that is, the valid data being changed according to data change request of the disk area that needs to be protected, is processed in the first processing module 16. The first processing module 16 writes the recovery point data in the private partition-managing module 14. The private partition-managing module can only be used by the backup/recovery system. Parts of the areas of the disk 76 are delimited as the special purpose partition.

Data change source 56 is an abstract data change source, to deal with all the requests for changing data in the disk 76 for the backup/recovery system of the present invention. Data change source 56 issues the data change request to the write-in operation-managing module 18. The data change request includes the designated address of the disk and new data. The write-in operation-managing module 18 takes over all write-in operations to the disk 76 from outside. Upon analyzing and identifying those data that should be backed up, the write-in operation-managing module 18 issues the backup request to the first processing module 16 in order to back data up.

The present invention puts backup data in independent backup space so that the special purpose partition can effectively solved the storage shortage problem of the recovery points faced by the conventional backup/recovery software. The present invention also ensures the backup data won't be destroyed due to the shared storage partition that can be accessed by other programs. Hence, the shortcoming that the computer system cannot be restored to a normal state can be entirely avoided.

The backup/recovery system according to the present invention can protect much larger amount of states of computer data when such computer data is increased within the same duration and space, as compared to the protection provided by the conventional backup/recovery software. For instance, the present invention can protect at least 1500 of 3 Gb*3 days states of computer data, in the event of each backup space of 3 Gb and over a 3-day period. In contrast, the Goback software with dynamic backup technique can only protect 300 of 3 Gb*3 days states of computer data under the same condition, while the Ghost software with static backup technique can only protect 2 of 3 Gb*3 days states of computer data under such condition.

Furthermore, by using the backup/recovery system of the present invention, the data can be protected timelessly within a certain backup space, such as 3 Gb, while the Goback software with dynamic backup technique can only protect the data 3 days ago under such condition. Hence, the backup/recovery system of the present invention not only can protect a higher amount of states of the computer data but also can protect the data longer, as compared to other conventional backup/recovery software.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backup system, which is installed in a computer system having a first type data and a second type data stored therein, said first type data and said second type data being capable of changed respectively, said backup system comprising:
   a selecting module for selecting a first predetermined mode in accordance with said first type data and selecting a second predetermined mode in accordance with said second type data; and
   a processing module coupled to said selecting module for processing said first type data and said second type data, wherein
   said processing module backs up valid data being changed within said first type data while said first predetermined mode is selected by said selecting module, and
   said processing module backs up all valid data within said second type data while said second predetermined mode is selected by said selecting module, said first type data and said second type data being backed up prior to being changed.

2. The backup system according to claim 1, wherein said first type data includes temporary data, and said second type data includes perpetual data needed to be preserved over a long period of time.

3. The backup system according to claim 1, wherein said processing module executes a backup program.

4. The backup system according to claim 1, wherein said first type data is stored into a first data storage space of said computer system.

5. The backup system according to claim 4, wherein the size of said first data storage space is variable.

6. The backup system according to claim 1, wherein said second type data is stored into a second data storage space of said computer system.

7. The backup system according to claim 6, wherein the size of said second data storage space is variable.

8. The backup system according to claim 1, wherein said fist type data is stored into a first variable data storage space in said computer system, and said second type data is stored into a second variable data storage space in said computer system, said first variable data storage space and said second variable data storage space being adjustable in size and proportion.

* * * * *